United States Patent [19]

Narula et al.

[11] Patent Number: 5,543,367

[45] Date of Patent: Aug. 6, 1996

[54] PYROLYTIC CONVERSION OF PAINT SLUDGE TO USEFUL MATERIALS

[75] Inventors: Chaitanya K. Narula, Ann Arbor; Byung R. Kim, West Bloomfield; Irving T. Salmeen, Ann Arbor, all of Mich.

[73] Assignee: Ford Motor Company, Dearborn, Mich.

[21] Appl. No.: 508,875

[22] Filed: Jul. 28, 1995

[51] Int. Cl.$^6$ .......................... C04B 35/00; C04B 35/468
[52] U.S. Cl. ............... 501/87; 501/96; 501/134; 501/137; 501/155
[58] Field of Search .................. 501/155, 137, 501/96, 134, 87

[56] References Cited

U.S. PATENT DOCUMENTS

| | | | |
|---|---|---|---|
| 2,626,220 | 1/1953 | Thurnauer et al. | 501/137 |
| 4,606,906 | 8/1986 | Ritter et al. | 501/137 |
| 4,829,033 | 5/1989 | Menashi et al. | 501/137 |
| 5,129,995 | 7/1992 | Agarwal | 201/21 |
| 5,198,018 | 3/1993 | Agarwal | 75/401 |

*Primary Examiner*—Wayne Langel
*Attorney, Agent, or Firm*—Lorraine S. Melotik; Roger L. May

[57] ABSTRACT

The invention is a process for decomposing dried paint sludge to recover the organic and inorganic components of the paint sludge as gaseous, liquid, and composite materials. The process comprises drying the paint sludge to remove water and organic solvents, pyrolizing the dried paint sludge in an inert atmosphere in an elevated temperature of up to about 600° C. to form gaseous and liquid decomposition materials and a solid residue. The process further comprises collecting the gaseous and liquid decomposition materials and subjecting the solid residue to sintering in an elevated temperate of about 900° to 1300° C. in an atmosphere of nitrogen, argon or ammonia to convert the solid residue to composite materials comprising barium nitranate and titanium compounds such as titanium dioxide, titanium nitride, and titanium carbide. The gaseous and liquid materials may be further pyrolyzed to carbon materials.

7 Claims, 2 Drawing Sheets

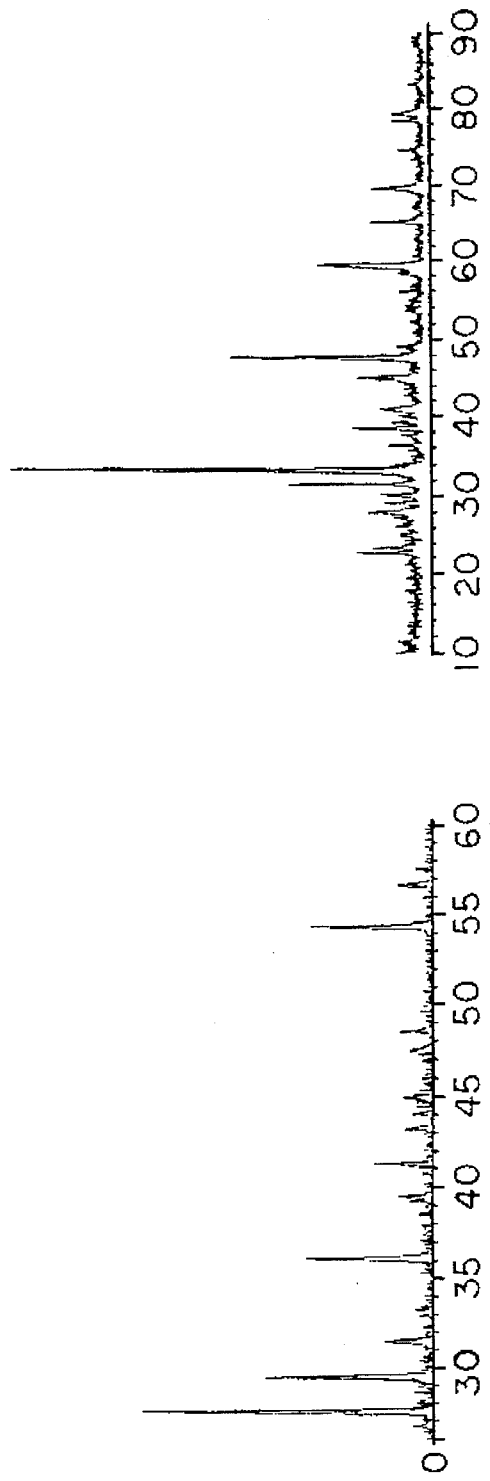
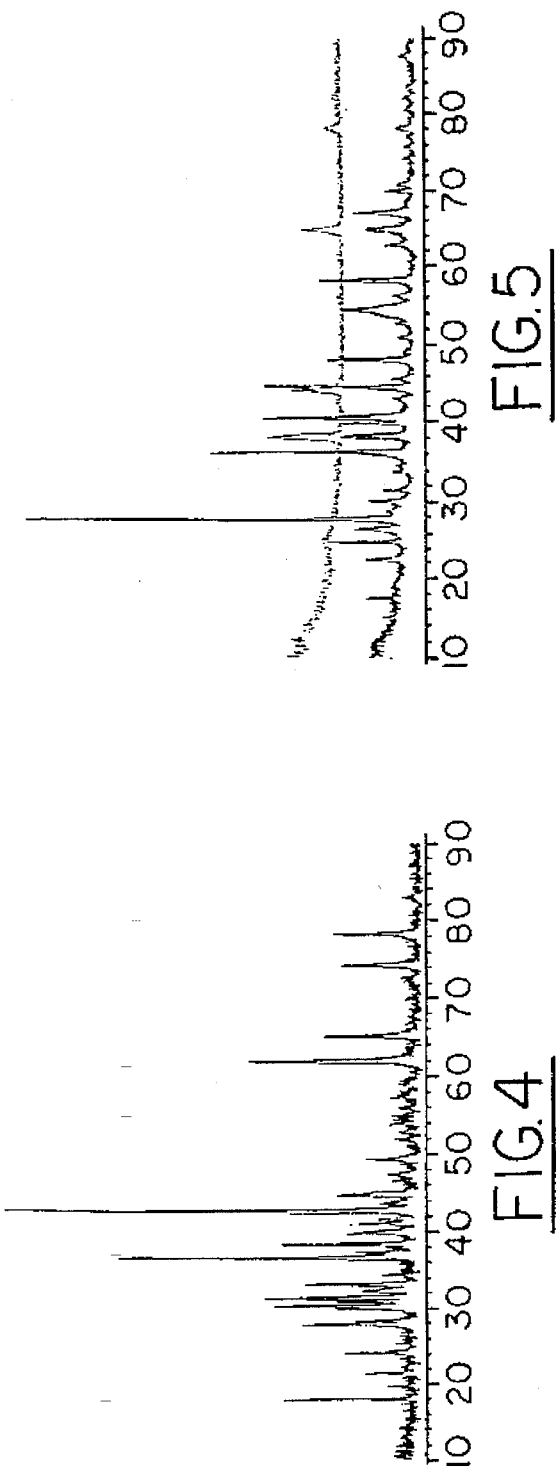

PYROLYTIC CONVERSION OF PAINT SLUDGE TO USEFUL MATERIALS

FIELD OF THE INVENTION

The invention is directed to the pyrolyric conversion of paint sludge to useful materials.

BACKGROUND OF THE INVENTION

The paint operations of typical automotive assembly plants produce hundreds of thousands of pounds of paint waste annually. Paint that misses the vehicle bodies is collected in the spray booths in a water scrubber. Polymeric materials are generally added to the water which cause the paint to coagulate into particles. After the particles settle, this paint sludge is transported to landfills. In view of the substantial amount of paint waste produced annually, it would be economically and environmentally desirable to extract useful materials from the paint sludge in order to reduce or eliminate the amount of paint sludge that is deposited in landfills.

Attempts have been made to recover useful materials from paint sludge. Kim et al describe a process for pyrolyzing paint sludge mixed with potassium hydroxide at 600° C. to prepare activated carbon. (Paper No. AC945105, 67th Annual Conference of Water Environment Federation, Chicago, Ill. Oct. 15, 1994) This activated carbon is a high surface-area char containing inorganic oxides which is suggested to be useful to trap volatile organic compounds in manufacturing plants. In particular, Kim et al. suggest adding the char into the paint booth scrubber water to remove volatile organic compounds from the spray booth air. This pyrolysis process for converting the paint sludge to char recovers less than 30–40% of the total mass of the dried paint waste. Another approach for paint sludge reclamation is described by Agarwal in U.S. Pat. Nos. 5,129,995 and 5,198,018. They disclose a process and apparatus for the continuous pyrolyric decomposition of waste stream materials containing organic and inorganic components. The inorganic components are recovered, carbon free, and recycled into essentially the same source materials from which they originated. The organic components are collected in liquid or gaseous form, as pyro oil and pyro gas, respectively. They disclose using these organics to fire the apparatus or mixing them with other oil, e.g., heating oil. Hence, the organics are expected to be merely burnt. Argawal's focus is thus on the recycling of inorganic oxides. In the latter patent, for example, dried paint sludge, which comprises about 40% non-aqueous content, is pyrolyzed and about 25% of the non-aqueous content is recovered as inorganic oxide material which is reused as paint filler.

It would be desirable to convert substantially all of the dried paint waste into useful, recyclable materials. The present invention method overcomes the deficiencies of prior paint waste recovery processes in that it typically recovers 100% of the paint sludge as recyclable materials in the form of gaseous materials, volatile liquid materials, and ceramic composite materials, or materials made therefrom.

SUMMARY OF THE INVENTION

The invention is a process for decomposing dried paint sludge, such as automotive paint sludge, to recover substantially all inorganic and organic components of the paint as useful materials. The materials may be in the form of gaseous, liquid, and composite materials. The process comprises the steps of: drying paint sludge at a temperature below about 200° C., preferably under a vacuum, for a time sufficient to remove substantially all of the water and organic solvents present in the paint sludge, pyrolizing the dried paint sludge in an inert atmosphere comprising nitrogen or argon at an elevated temperature of up to about 600° C. and for a time sufficient to form gaseous and liquid decomposition materials and solid residue, collecting the gaseous and liquid decomposition materials, and subjecting the solid residue to further pyrolysis in an atmosphere selecting from the group consisting of nitrogen, argon, ammonia at a temperature of between about 900° C. and 1300° C. for a time sufficient to sinter the solid residue to form an inorganic composite material comprising barium titanate and titanium compounds. The collected gaseous and liquid decompositions materials may be subjected, either individually or together, to further pyrolysis in an inert atmosphere at a temperature of at least 800° C., preferably between 800° C. and 1200° C. for a time to convert them to carbon materials, such as amorphous and turbostratic carbon materials.

BRIEF DESCRIPTION OF THE DRAWINGS

FIG. 2 is an x-ray powder diffraction pattern of powder residue obtained on pyrolysis of dried paint waste according to an embodiment of the present invention.

FIG. 3 is an x-ray powder diffraction pattern of powder residue obtained on pyrolysis of dried paint waste according to an embodiment of the present invention.

FIG. 4 is an x-ray powder diffraction pattern of powder residue obtained on pyrolysis of dried paint waste according to an embodiment of the present invention.

FIG. 5 is an x-ray powder diffraction pattern of (1) thin films and (2) powder residue obtained on pyrolysis of dried white paint.

DESCRIPTION OF PREFERRED EMBODIMENT

Figure 1A:
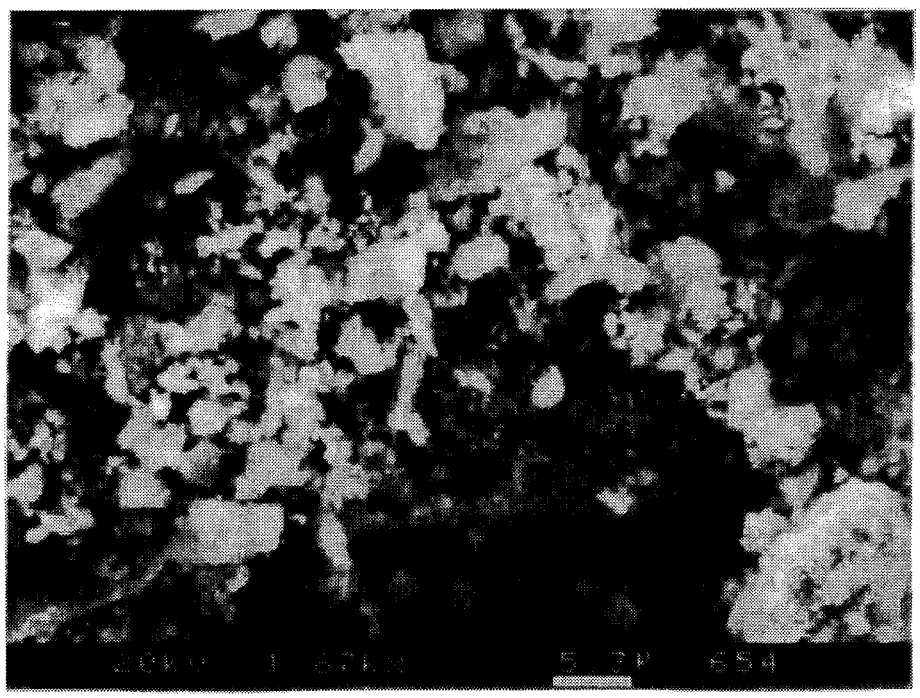
FIG. 1A and 1B are a scanning electron micrographs of powder obtained on pyrolysis of dried paint waste according to an embodiment of the present invention.

As disclosed above, the process involves decomposing dried paint sludge, e.g., automotive paint sludge, to recover substantially all of the organic and inorganic components of the paint sludge as gaseous, liquid, and composite materials. By "substantially all" is meant that at least about 50%, generally at least 50%–90% of the dried paint sludge is converted to useful materials according to the method of this invention. Paint sludge is produced in significant quantities in automotive plants. Generally, it is collected from spray booths in a water scrubber, caused to coagulate and settle out. Sludge produced in this or any other fashion is suitable to be treated according to the process of the present invention. Examples of paints which may be treated according to the process of the present invention include, but are not limited to, those having components such as polyester, titanium oxide, melamine, urethane, and methylene diphenyl diisocyanate.

The paint sludge is first subjected to drying. This drying is carried out by subjecting the paint sludge to a temperature below about 200° C., preferably under a vacuum, for a time sufficient to remove the water and organic solvents present in the sludge. These can be recovered and separated, whereafter the water would be further purified to remove dissolved organic solvents. Typically, for drying the sludge, a vacuum of 1.0 mm Hg has been found to be particularly useful when used with a temperature of about 170° C. As would be appreciated by those skilled in the art, selection of the optimal conditions of temperature and vacuum would be dependent on the particular composition of the paint sludge and within the skill of one in the art in view of the present disclosure.

The dried paint sludge is then pyrolized in an inert atmosphere selected from nitrogen or argon, at a temperature up to about 600° C. This relatively low temperature pyrolysis is carried out for a time sufficient to convert the dried paint sludge into three types of materials: (a) gaseous decomposition materials, (b) liquid decomposition materials, and (c) solid residue materials. Typically, in the present invention, it has been found that the paint sludge is converted into these materials in a ratio by weight of about 1:1:1. Generally, it was found that the gaseous materials were eliminated in a temperature range of between about 50°–550° C. These off-gasses may be trapped and cooled, for example, in a dry ice-isopropanol trap. This is desirable because they can be converted to liquid form for easier handling. Chemical analysis of these liquefied gaseous materials, from paint sludge obtained from one sample of Ford paint facilities, indicated that they were hydrocarbons or organic materials like 2-butene and 1-methoxy-1-propene or their isomers, respectively. These gaseous decomposition materials are useful as precursors for preparation of carbon and as fuel gas.

The liquid fraction produced generally was collected during the pyrolysis in a temperature range of about 50°–600° C. The collected liquid was found to contain a variety of organic polymers. Distillation of the liquid material separated the liquid into its various fractions. Chemical analysis of the liquid fractions from the same paint sludge processed above revealed that it comprised amides, melamine, and aliphatic esters. These fractions did not contain any aromatic materials. These materials may be reused, e.g., as precursors for the preparation of carbon which may be made by passing the liquid materials through a preheated tube.

According to another aspect of the invention process, the collected gaseous and liquid decomposition materials may be subjected to further pyrolysis at temperatures above about 800° C., preferably between about 800° C. and 1200° C., in an inert atmosphere such as nitrogen or argon. These decomposition materials can be collected (separately or together) and maintained at this elevated temperature for a time sufficient to convert the materials to carbon products, e.g., amorphous and turbostratic carbon materials. As would be apparent to those skilled in the art in view of this disclosure, various shapes and forms of carbon materials may be prepared and depend on the pyrolysis conditions. The teachings of Carbon Black: Science and Technology, eds. J. P. Donner, R. C. Bansal, M-J. Wand, Marcel Dekker, Inc., New York, 1993 are herein incorporated by reference relative such preparation techniques. This carbon may be used in numerous applications, e.g., carbon black fillers, carbon-carbon composites, carbon ceramic composites, to name a few.

The solid residue material produced by this low temperature pyrolysis was analyzed and found to comprise materials like barium titanate ($BaTiO_3$) and rutile titanium dioxide $TiO_2$. One Scanning Electron Micrograph (SEM) of a solid residue sample from pyrolysis of paint waste at 600° C. in an atmosphere is shown in FIG. 1A. It discloses the particle size of the materials to be approximately 0.2–0.3 micrometers. The x-ray diffraction pattern of the sample processed in this way is shown in FIG. 2 and discloses the present of the barium titanate and rutile titanium dioxide.

According to the present invention, it is desired to further pyrolize this solid residue at an elevated temperature in order to convert it by sintering to useful composite materials. This is done by subjecting the solid residue to a temperature of between about 900° C. and 1300° C. in an atmosphere selected from a group consisting of nitrogen, argon, and ammonia. This further pyrolysis is carried out for a time sufficient to sinter the solid residue to an inorganic composite material comprising barium titanate and titanium compounds.

The particular composition of the titanium compounds depends on the particular pyrolysis atmosphere used. When the high temperature pyrolysis (900° C.–1300° C.) is carried out in an argon atmosphere, the composite materials produced include barium titanate and titanium dioxide, and titanium carbide if pyrolyzed above about 1000° C. If high temperature pyrolysis is carried out in a nitrogen atmosphere, barium titanate, titanium oxide and carbon are formed at the lower end of the high temperature range, and above about 1000° C. titanium nitride and titanium carbide are formed. The titanium carbide then slowly converts to titanium nitride. If the high temperature sintering is carried out instead in an ammonia atmosphere, the composite materials produced by the sintering include barium titanate and titanium nitride (TiN). These latter composite materials contain less carbon than that present in the materials produced when the pyrolysis is carried out under an ammonia atmosphere. All composites at least initially contain carbon as a component which is amorphous under the experimental conditions described herein. The carbon component can be substantially reduced or completely removed by carrying out pyrolysis thereof in an ammonia atmosphere for a suitable time. For example, a sample obtained after pyrolysis at 600° C. contains 27.9% carbon after pyrolysis in a nitrogen atmosphere at 1000° C. but only 7.9% carbon after pyrolysis in an ammonia atmosphere at 1000° C. for 4 hours.

Figure 1B:
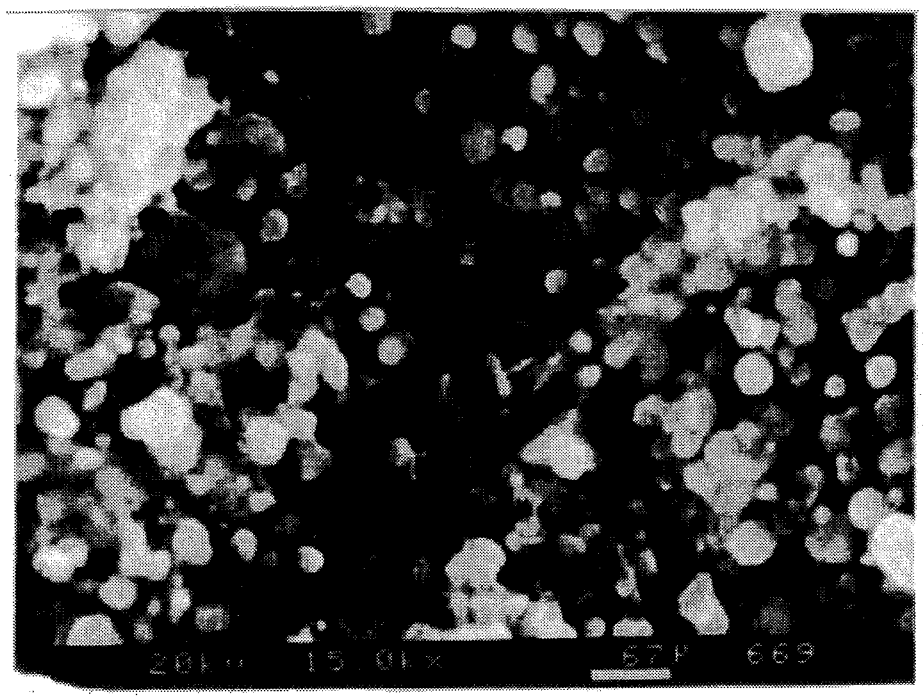

The x-ray diffraction pattern (XRD) of a powder produced by sintering the solid residue material under nitrogen at 1,000° C. is shown in FIG. 3. From the diffraction peaks it is clear that the sintered materials include barium titanate and titanium dioxide. The particle size of this composite material was determined to be about 0.25–0.35 micrometers by Scanning Electron Micrographs (SEM) as shown in FIG. 1B. When the solid residue materials were instead pyrolyzed in an ammonia atmosphere at 1,000° C., the XRD of the resultant powder shows diffraction peaks associated with the barium titanate and the titanium nitride in the resultant powder (FIG. 4). Particle size of the resultant composite in this latter sample was determined by SEM to be about 0.4 micrometers. In addition to titanium nitride, some presence of titanium oxynitride is also seen in FIG. 4.

For comparison, BASF white paint was also pyrolized according to the process of the present invention. During the pyrolysis, which was carried out under a nitrogen atmosphere, a film was formed on the surface of the pyrolysis tube which was analyzed by tests including x-ray diffraction (XRD) and x-ray photoelectron spectroscopy(XPS). The film showed diffraction peaks due to titanium nitride only in its XRD, as shown in FIG. 5(1). The XPS of the film is dominated by amorphous carbon and only one peak of carbon is observed. The powder produced after the high temperature pyrolysis (here being 1,000° C.) in an inert atmosphere (here a nitrogen atmosphere) was analyzed by XRD techniques and showed diffraction peaks as seen in FIG. 5(2) due to barium titanate and titanium nitride and $TiO_2$ crystallized in a rutile phase.

These composite materials produced according to embodiments of the present invention are useful, e.g., for incorporation into other materials to act as reinforcing fillers.

We claim:

1. A process for decomposing dried paint sludge to recover the organic and inorganic components of the paint sludge as gaseous, liquid, and composite materials, which process comprises the steps of:

drying the paint sludge at a temperature below about 200° C. for a time sufficient to remove water and organic solvents present in the paint sludge;

pyrolizing the dried paint sludge in an inert atmosphere comprising nitrogen or argon at an elevated temperature of up to about 600° C. for a time sufficient to form gaseous and liquid decomposition materials and a solid residue;

collecting the gaseous and liquid decomposition materials; and subjecting the solid residue to further pyrolysis in an atmosphere selected from the group consisting of nitrogen, argon and ammonia at a temperature of between about 900° C. and 1300° C. for a time sufficient to sinter the solid residue to form an inorganic composite material comprising barium titanate and titanium compounds.

2. The process according to claim 1 wherein the drying step is carried out under a vacuum.

3. The process according to claim 1, wherein the gaseous decomposition material is cooled to convert it to liquid form.

4. The process according to claim 1, wherein said gaseous and liquid decomposition materials, together or separately, are subjected to further pyrolysis in an inert atmosphere at a temperature above about 800° C. for a time sufficient to convert the gaseous and liquid decomposition materials to carbon materials.

5. The process according to claim 1, wherein the titanium compound is titanium nitride when said solid residue is sintered in an ammonia atmosphere.

6. The process according to claim 1 wherein said titanium compound comprises titanium dioxide when said solid residue is sintered in an argon atmosphere.

7. The process according to claim 1 wherein said titanium compound comprises titanium nitride and titanium carbide when said solid residue is sintered in a nitrogen atmosphere above about 1000° C.

* * * * *